US012365525B2

(12) United States Patent
Anvar et al.

(10) Patent No.: US 12,365,525 B2
(45) Date of Patent: Jul. 22, 2025

(54) APPARATUS AND METHOD FOR PRODUCING NANOEMULSIONS

(71) Applicants: Seyed Amirali Anvar, Tehran (IR); Sara Allahyaribeik, Tehran (IR); Maryam Ataee, Tehran (IR); Hamed Ahari, Tehran (IR); Mehdi Rahimian, Tehran (IR); Leila Golestan, Tehran (IR); Fereshte Sahraei, Tehran (IR); Sima Moradi, Tehran (IR)

(72) Inventors: Seyed Amirali Anvar, Tehran (IR); Sara Allahyaribeik, Tehran (IR); Maryam Ataee, Tehran (IR); Hamed Ahari, Tehran (IR); Mehdi Rahimian, Tehran (IR); Leila Golestan, Tehran (IR); Fereshte Sahraei, Tehran (IR); Sima Moradi, Tehran (IR)

( * ) Notice: Subject to any disclaimer, the term of this patent is extended or adjusted under 35 U.S.C. 154(b) by 51 days.

(21) Appl. No.: 18/450,105

(22) Filed: Aug. 15, 2023

(65) Prior Publication Data

US 2024/0174419 A1 May 30, 2024

Related U.S. Application Data

(60) Provisional application No. 63/428,018, filed on Nov. 25, 2022.

(51) Int. Cl.

| | |
|---|---|
| ***B06B 1/20*** | (2006.01) |
| ***B65D 65/38*** | (2006.01) |
| ***C12M 1/04*** | (2006.01) |

(52) U.S. Cl.
CPC ................ *B65D 65/38* (2013.01); *B06B 1/20* (2013.01); *Y10S 977/84* (2013.01)

(58) Field of Classification Search
None
See application file for complete search history.

(56) References Cited

U.S. PATENT DOCUMENTS

| | | | | |
|---|---|---|---|---|
| 2021/0015786 | A1 * | 1/2021 | Han | A61K 8/06 |
| 2021/0046141 | A1 * | 2/2021 | Ahari | A61K 9/1075 |
| 2022/0047469 | A1 * | 2/2022 | Zarket | A61K 8/042 |
| 2022/0193003 | A1 * | 6/2022 | Alugupalli | A61K 31/4184 |
| 2023/0218645 | A1 * | 7/2023 | Kielbowicz | A61K 47/26 424/776 |

OTHER PUBLICATIONS

Calligaris et al., Nanoemulsion preparation by combining high pressure homogenization and high power ultrasound at low energy densities, May 2016, Food Research International, vol. 83, pp. 25-30 (Year: 2016).*

(Continued)

*Primary Examiner* — Holly Kipouros
(74) *Attorney, Agent, or Firm* — Barry Choobin; Patent 360

(57) ABSTRACT

An apparatus and method for preparing nanoemulsions from an oil phase and an aqueous phase, wherein the oil phase can be essential oils, such as damask rose essential oil. The apparatus includes a homogenization unit having a homogenization tank and a sonication unit comprising a sonication tank. The dispersion of oil phase and aqueous phase is passed between the homogenization unit and sonication unit multiple times to prepare the nanoemulsion.

5 Claims, 12 Drawing Sheets

(56) References Cited

OTHER PUBLICATIONS

Besseling et al., Realtime Droplet Size Monitoring Of Nano-Emulsions During High Pressure Homogenization, InProcess-LSP white paper, Jun. 2021 (Year: 2021).*

Panagiotou et al., Production of Nanoemulsions at Relevant Industrial Rates: Innovative Scale-up Strategies, TechConnect Briefs, 2019 (Year: 2019).*

* cited by examiner

APPARATUS AND METHOD FOR PRODUCING NANOEMULSIONS

CROSS-REFERENCE TO RELATED APPLICATIONS

This application claims priority from a U.S. Provisional Patent Application Ser. No. 63/428,018, filed on Nov. 25, 2022, the disclosure of which is hereby incorporated by reference in their entirety.

This invention has been sponsored by the Science and Research Branch, of Islamic Azad University, Tehran, Iran for international filing.

FIELD OF INVENTION

The present disclosure relates to nanoemulsions, and more particularly, the present invention relates to an apparatus and method for producing damask rose essential oil nanoemulsion.

BACKGROUND

Biodegradable packaging based on nanocomposites containing active ingredients is being widely used in food packaging. The nanoemulsions containing active ingredients can be used to produce biodegradable packaging in the form of films and coatings, to maintain the quality and functional characteristics, nutritional value, and shelf life of foods.

Conventional ultrasonic systems are recognized as a reliable tool to produce long-term stable nanoemulsions. Mechanical homogenization uses direct physical force to produce biologically stable emulsions. Homogenizers create suspensions or emulsions of mutually insoluble material. The employed rpm plays a significant role in the quality of the prepared nanoemulsion.

Considering food packaging systems, nanoemulsions have shown significant potential in developing new active food packaging systems. Previous studies showed that nanoemulsions are effective as antifungal, antibacterial, and antioxidant agents. Nanoemulsions can also be employed as a nanocarrier to improve their effectiveness as any kind of agent. For example, essential oils due to their unique properties as antibacterial and antioxidants are widely used in different areas of food packaging systems. Efforts have been made in the past for making more stable nanoemulsions of essential oils.

However, the Lack of stability of the nanoemulsions is a challenge. Moreover, it has been observed that nanodroplets decrease the efficacy of the food packaging system. Thus, the type and quality of the dispersed phase are significant.

A need is therefore appreciated for an apparatus and method of producing nanoemulsions having improved stability that can be used in food packaging.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to an in-line ultrasonic homogenizer for producing nanoemulsions with improved stability and shelf life.

It is another object of the present invention that the stable nanoemulsions of essential oils can be produced.

It is still another object of the present invention that a stable nanoemulsion of Rosa Damascena essential oil can be produced.

It is yet another object of the present invention that the process can be easily scaled up.

It is a further object of the present invention that a nanoemulsion with a mean diameter of 100-150 nanometers can be produced.

It is still a further object of the present invention that the processing time can be reduced significantly.

It is yet a further object of the present invention to produce 15 L Rosa Damascena essential oil nanoemulsion with a concentration of 1%.

It is an additional object of the present invention that the Rosa Damascena essential oil nanoemulsion can be prepared in about 10 min.

In an aspect, disclosed is an in-line ultrasonic homogenizer in which a continuous working fluid (nanoemulsion) is passed first through the homogenizer and then the ultrasonic tank. It has been found that simultaneous homogenization and sonication result in more stable and homogenous nanoemulsions on large scale (>15 lit).

In one aspect, disclosed is a nanoemulsion of Rosa Damascena essential oil made of an oil phase, aqueous phase, and appropriate surfactants produced by a 15-L apparatus equipped with an in-line homogenizer and ultrasonic system.

In one aspect, an air-lift-based bioreactor is used as a primary process to produce the initial macroemulsion.

In one aspect, degassing in the ultrasonic bath has been considered to produce a more uniform nanoemulsion.

In one aspect, a highly stable nanoemulsion of Rosa Damascena essential oil without phase separation for up to six months can be produced using a 15-L high-energy apparatus.

In one aspect, disclosed is a method of preparing Rosa Damascena essential oil nanoemulsion. The method includes extraction of Rosa Damascena essential oil, which is used as an oil phase; the addition of the oil phase into the aqueous phase (deionized water) dropwise under stirring using a homogenizer as a high shearing mixer; addition of the surfactant (tween 80, Span 80) into the homogenized solution under stirring using a homogenizer; and continuously sonication of the obtained dispersion using the ultrasonicate system. The process can be carried out at the desired temperature.

The advantages and features of this invention will be more clearly understood with reference to the following more detailed description and claims taken in conjunction with the accompanying drawings.

BRIEF DESCRIPTION OF THE DRAWING

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Disclosed are an apparatus and method for producing nanoemulsions from essential oil. The disclosed apparatus can provide for the in-line production of nanoemulsions wherein a continuous stream of the homogenized mixture is circulated between a homogenizer unit and a sonication unit as a continuous stream. The disclosed apparatus includes a homogenization tank and a sonification tank, wherein the homogenization tank and the sonification tank are fluidly connected through pipelines. The working liquid (dispersion) can be passed from the homogenization tank to the sonification tank and from the sonification tank to the homogenization tank as a continuous stream. The volume of the homogenization tank, the sonification tank, and the working liquid (dispersion) is important to ensure the circulation of the dispersion.

Figure 1:
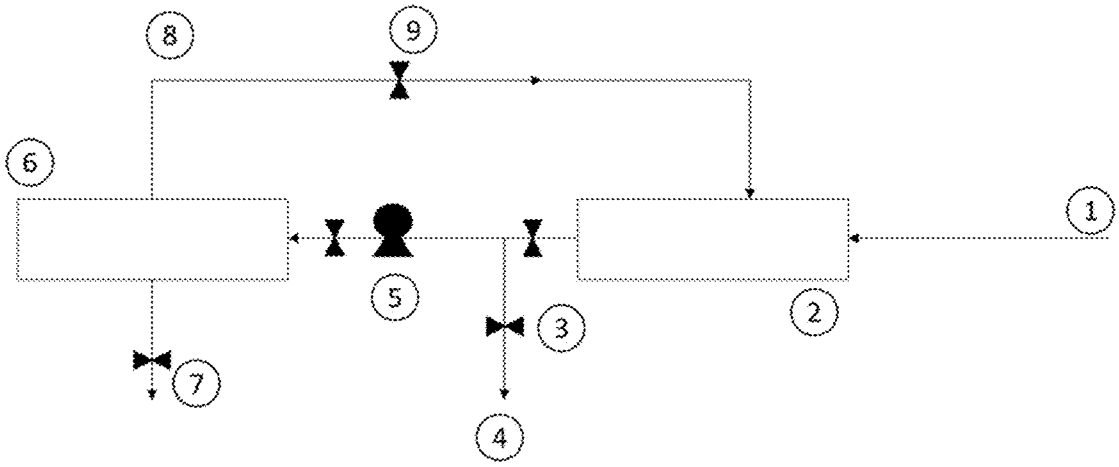
FIG. 1 is a flowchart illustrating the process according to an exemplary embodiment of the present invention.

Referring to FIG. 1 is a schematic diagram showing an overview of the disclosed apparatus 100. The apparatus has an inlet 1 for receiving different ingredients into a homogenization tank 2. Through the inlets can be added aqueous phase, oil phase, and other emulsifying agents. A dispersion of the aqueous phase and the oil phase can also be added to the inlet. FIG. 1 further shows a gate valve 3, a first drain 4, a pump 5, an ultrasonic tank 6, a production drain 7, a bypath 8, and a bypath valve 9.

Figure 2:
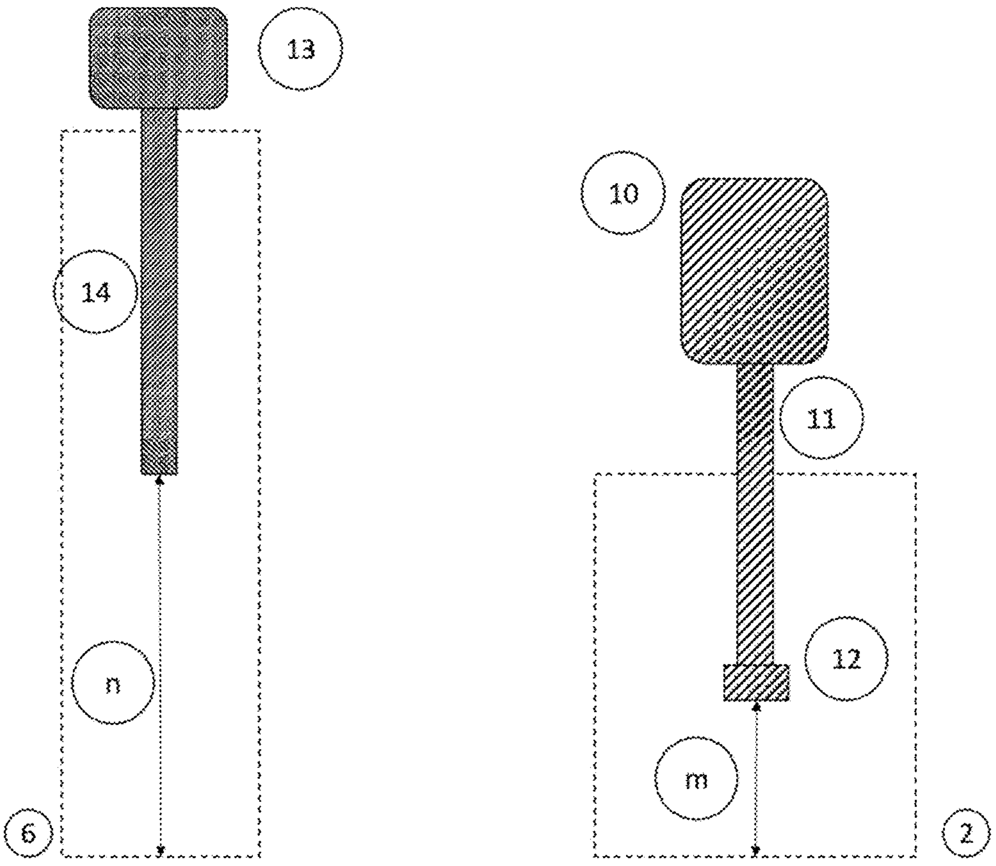
FIG. 2 depicts the homogenization unit and the sonication unit of the apparatus.

Referring to FIG. 2 shows the system has an in-line homogenizer unit and an ultrasonic unit. The homogenizer unit can include a homogenizer motor 10 and a shaft 11 connecting the homogenizer motor 10 to a homogenizer head 12. The ultrasonic unit can include an ultrasonicator 13, and a sonication probe 14. The sonication probe 14 can be higher from the base of the tank than the homogenizer head 12. For example, the sonication probe can be about 20 cm from the bottom of the tank. The homogenizer head 12 can be about 15 cm from the bottom of the tank. The said dimensions can be for a 15 L apparatus.

Again, referring to FIG. 1 is a flow diagram of the process showing the homogenization and sonication steps that occur in two distinct tanks. The tanks can be connected using two pipelines. The apparatus can be manufactured from a suitable material, such as steel. A pump can be used to pump the dispersion from the homogenizer tank to the sonication tank through one of the two feed lines. A bypath is also shown to circulate the dispersion as a continuous stream. The homogenizer tank, sonication tank, and fluid lines can be provided with gate valves for sampling. Each tank can have a specific volume, such as a volume of about 15 L. Embodiments are described herein for a 15 L apparatus having a 15 L homogenization tank and a 15 L sonication tank. Also, the embodiments herein are described for preparing Rosa Damascena essential oil nanoemulsion in a concentration of about 1% v/v nanoemulsion.

In certain implementations, Rosa Damascena essential oil nanoemulsion can be prepared using the disclosed apparatus. About 150 ml of Rosa Damascena essential oil can be added to 14.85 L of distilled water in the homogenization tank under vigorous agitation. Simultaneously, the pump can be turned on to transfer the microemulsion from the homogenization tank to the ultrasonication tank. Circulation can be started by opening the bypath. Emulsifying agents, such as Tween 80 can be added to increase the stability of the nanoemulsion. To aim this, after about 5 min, 150 ml of tween 80 can be added dropwise to the homogenization tank while the emulsion is under sonication in the sonification unit. The process can be carried out at room temperature.

EXAMPLES

Example 1: Preparation of the Nanoemulsion of Rosa Damascena Essential Oil (Process Duration: 10 min)

14.85 L of water was added to a bioreactor and the bioreactor was switched on. The operational parameters were adjusted: r: 500 rpm, P: 60 psi, T: 45-50° C., t: 30 min. 150 ml of the Rosa Damascena essential oil was added dropwise to the water. The process was continued for 30 min. Degassing was then employed using an ultrasonic bath under the following conditions: W: 37 kH, mode: de-gas, T: 45° C., and t: 5 min. At this step, the main emulsion was prepared. 14.85 L of the main emulsion was added to the homogenization tank. The homogenizer and the ultrasonication system were turned on. Then, the circulation pump was turned on and the apparatus was allowed to reach a stable condition. The homogenization parameters were adjusted as Power: 170 W, 2000 rpm, room temperature. The ultrasonic parameters were adjusted as Power: 170 W, off-set: 2 s, on-set: 8 s, and Room temperature.

Figure 3:
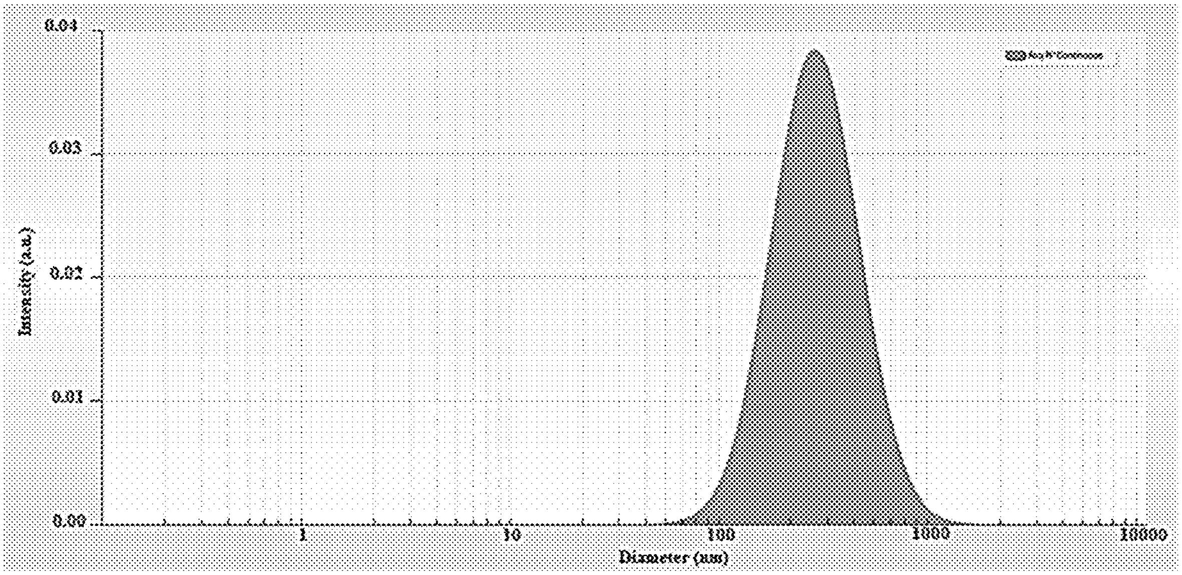
FIG. 3 shows the results of DLS analysis for the produced Rosa Damascena essential oil nanoemulsion at the processing time of 10 min.
Figure 4:
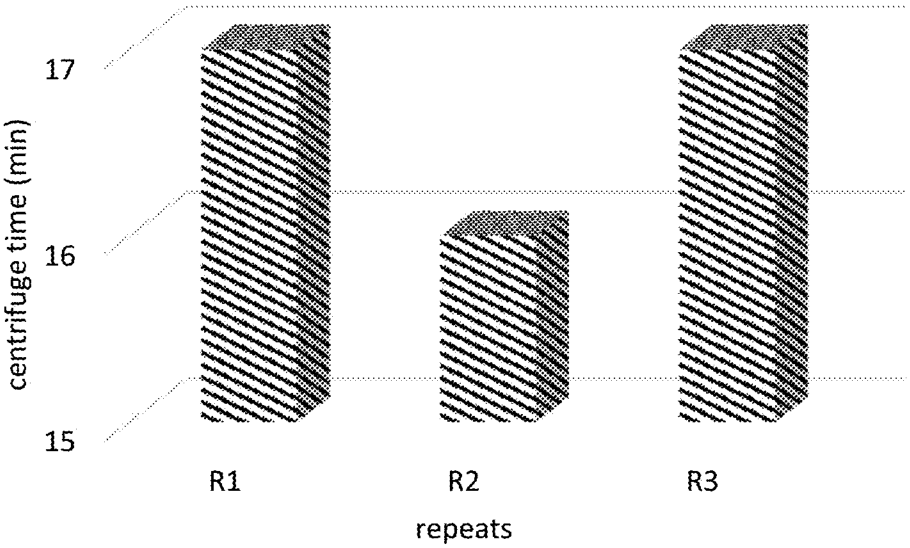
FIG. 4 shows the results of the stability of the Rosa Damascena essential oil nanoemulsion at a processing time of 10 min.
Figure 5:
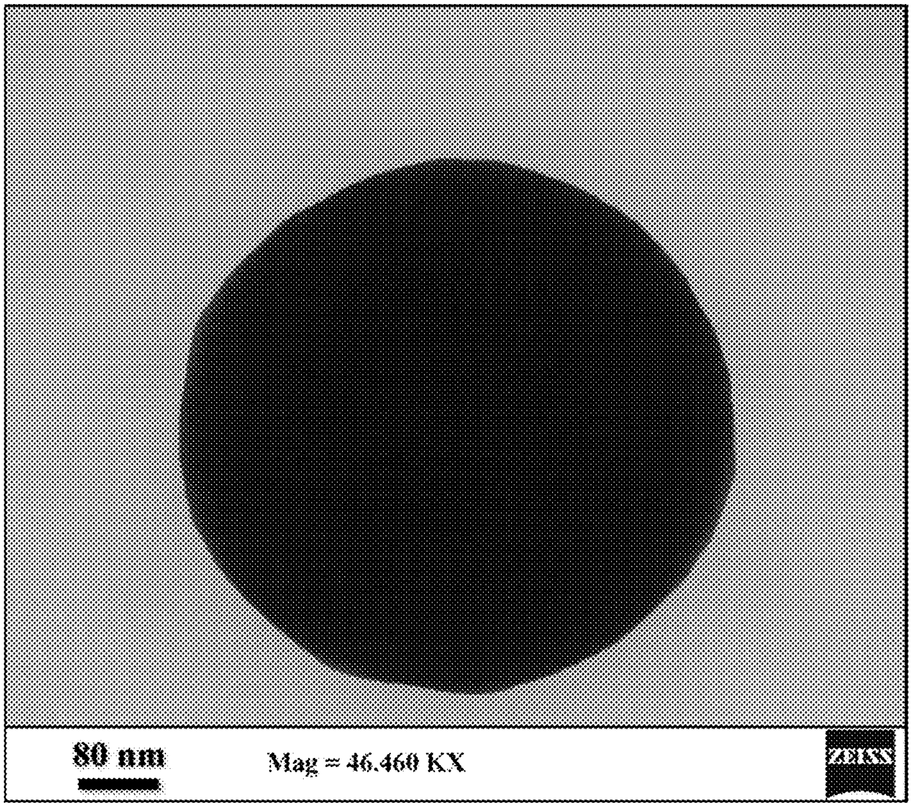
FIG. 5 shows the results of the TEM images for the produced Rosa Damascena essential oil nanoemulsion at the processing time of 10 min.

Thereafter, 150 mL of tween 80 was added dropwise to the homogenization tank after 5 min and the process was continued for 10 min. After 10 min, the sample was taken and nominated for further studies. The mean hydrodynamic diameter of nanodroplets was measured using DLS, and the results are shown in FIG. 3. The stability of the prepared nanoemulsion was measured using the centrifuge-based technique, and results shown in FIG. 4. TEM images show the spherical shape of the nanodroplets with a diameter of 560 nm, shown in FIG. 5. Based on the results from the DLS analysis, the mean diameter of the nanodroplets was found to be 300 nm, see FIG. 3. The created nanoemulsion was stable for seven minutes at 4000 rpm, it means that after 7 runs, phase separation was observed.

Example 2: Preparation of the Nanoemulsion of Rosa Damascena Essential oil (Process Duration: 15 min)

14.85 L of water was added to a bioreactor and the system was switched on. The operational parameters were adjusted: r: 500 rpm, P: 60 psi, T: 45-50° C., t: 30 min. 150 ml of the Rosa Damascena essential oil was added dropwise. The process was continued for 30 min. Degassing was then employed using an ultrasonic bath under the following conditions: W: 37 KH, mode: degas, T: 45° C., and t: 5 min. At this step, the main emulsion was prepared.

14.85 L of the main emulsion was added to the homogenization tank. The homogenizer and the ultrasonication system were switched on. Then, the circulation pump was turned on and the apparatus was allowed to reach a stable condition. The homogenization parameters were adjusted as Power: 170 W, 2000 rpm, room temperature. The ultrasonic parameters were adjusted as Power: 170 W, off-set: 2 s, on-set: 8 s, and Room temperature. 150 ml of tween 80 was added dropwise to the homogenization tank after 5 min and the process was continued for 15 min. After 15 min, the sample was taken and nominated for further studies.

Figure 6:
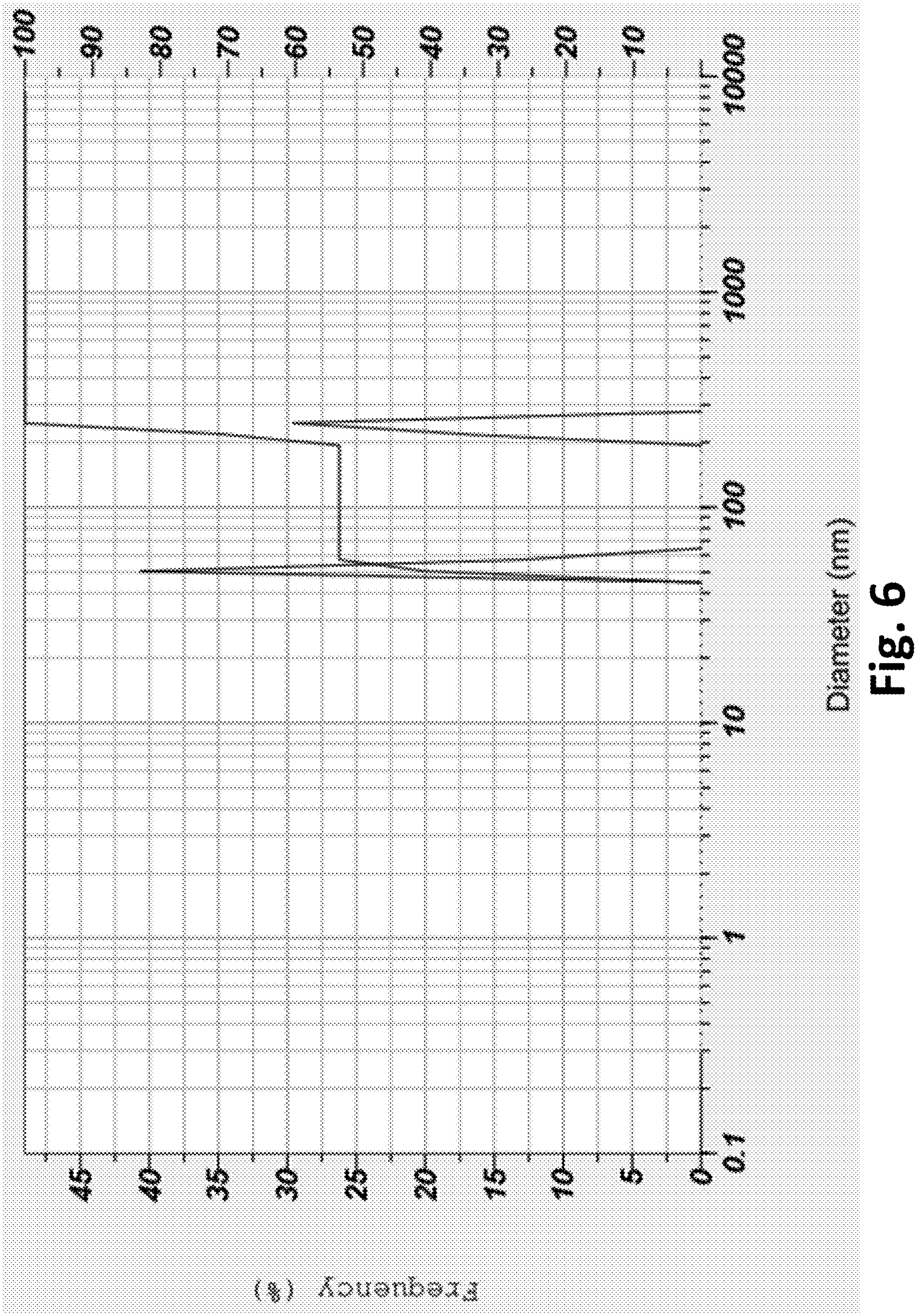
FIG. 6 shows the results of the DLS analysis for the produced Rosa Damascena essential oil nanoemulsion at a processing time of 15 min.
Figure 7:
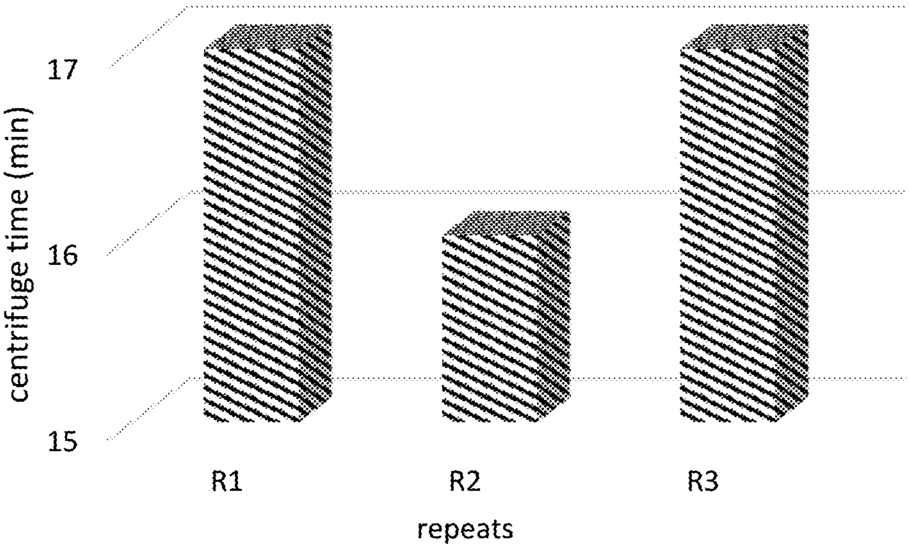
FIG. 7 demonstrates the Rosa Damascena essential oil nanoemulsion stability at a processing time of 15 min.
Figure 8:
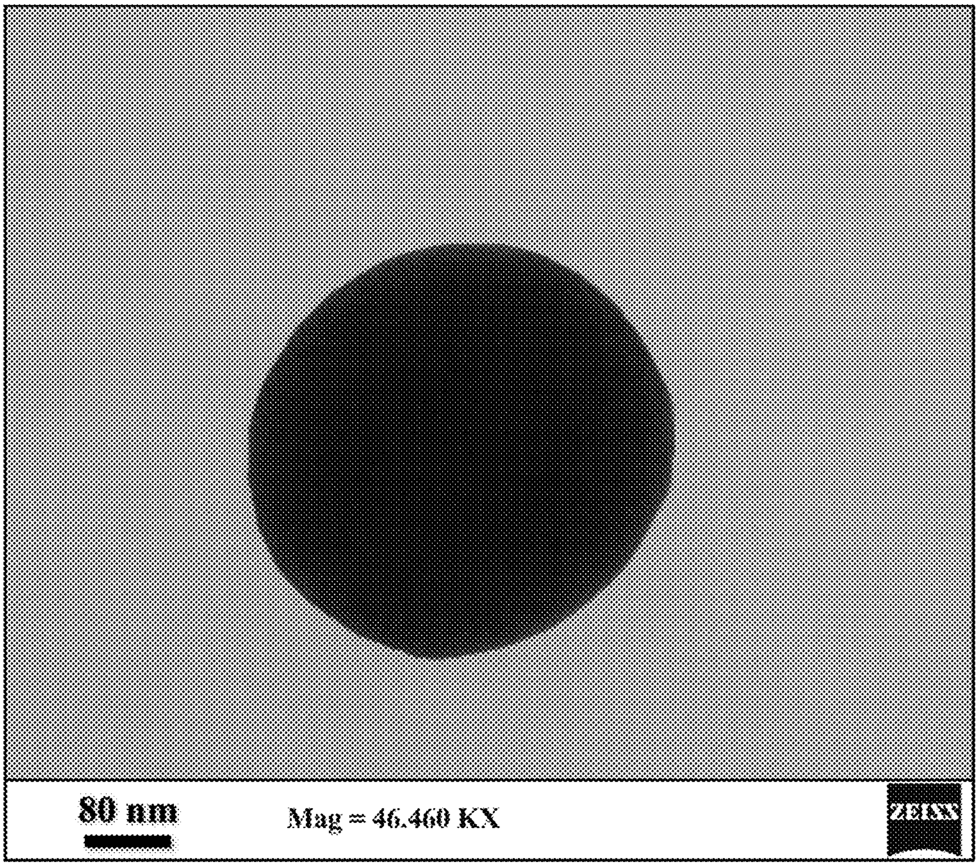
FIG. 8 shows the results of the TEM images for the produced Rosa Damascena essential oil nanoemulsion at a processing time of 15 min.

The mean hydrodynamic diameter of nanodroplets was measured using DLS, results are shown in FIG. 6. The stability of the prepared nanoemulsion was measured using the centrifuge-based technique, results shown in FIG. 7. The results of the TEM images show the spherical shape of the nanodroplets with a diameter of 300 nm (FIG. 8). Based on the results from the DLS analysis, the mean diameter of the nanodroplets was 50-120 nm, see FIG. 6. The created nanoemulsion was stable for 12 min at 4000 rpm. It means that after 12 runs, phase separation was observed.

Example 3: Preparation of the Nanoemulsion of Rosa Damascena Essential Oil (Process Duration: 20 min)

14.85 L of water was added to the bioreactor and the system was switched on. The operational parameters were adjusted: r: 500 rpm, P: 60 psi, T: 45-50° C., t: 30 min. 150 ml of the Rosa Damascena essential oil was added dropwise. The process continued for 30 min. Degassing was then employed using an ultrasonic bath under the following conditions: W: 37 kH, mode: degas, T: 45° C., and t: 5 min. At this step, the main emulsion was prepared. 14.85 L of the main emulsion was added to the homogenization tank. The homogenizer and the ultrasonication were switched on. Then, the circulation pump was turned on and the apparatus was allowed to reach a stable condition. The homogenization parameters were adjusted as Power: 170 W, 2000 rpm, room temperature. The ultrasonic parameters were adjusted as Power: 170 W, off-set: 2 s, on-set: 8 s, and Room temperature. 150 mL of tween 80 was added dropwise to the homogenization tank after 5 min and the process continued for 20 min. After 20 min, the sample was taken and nominated for further studies.

Figure 9:
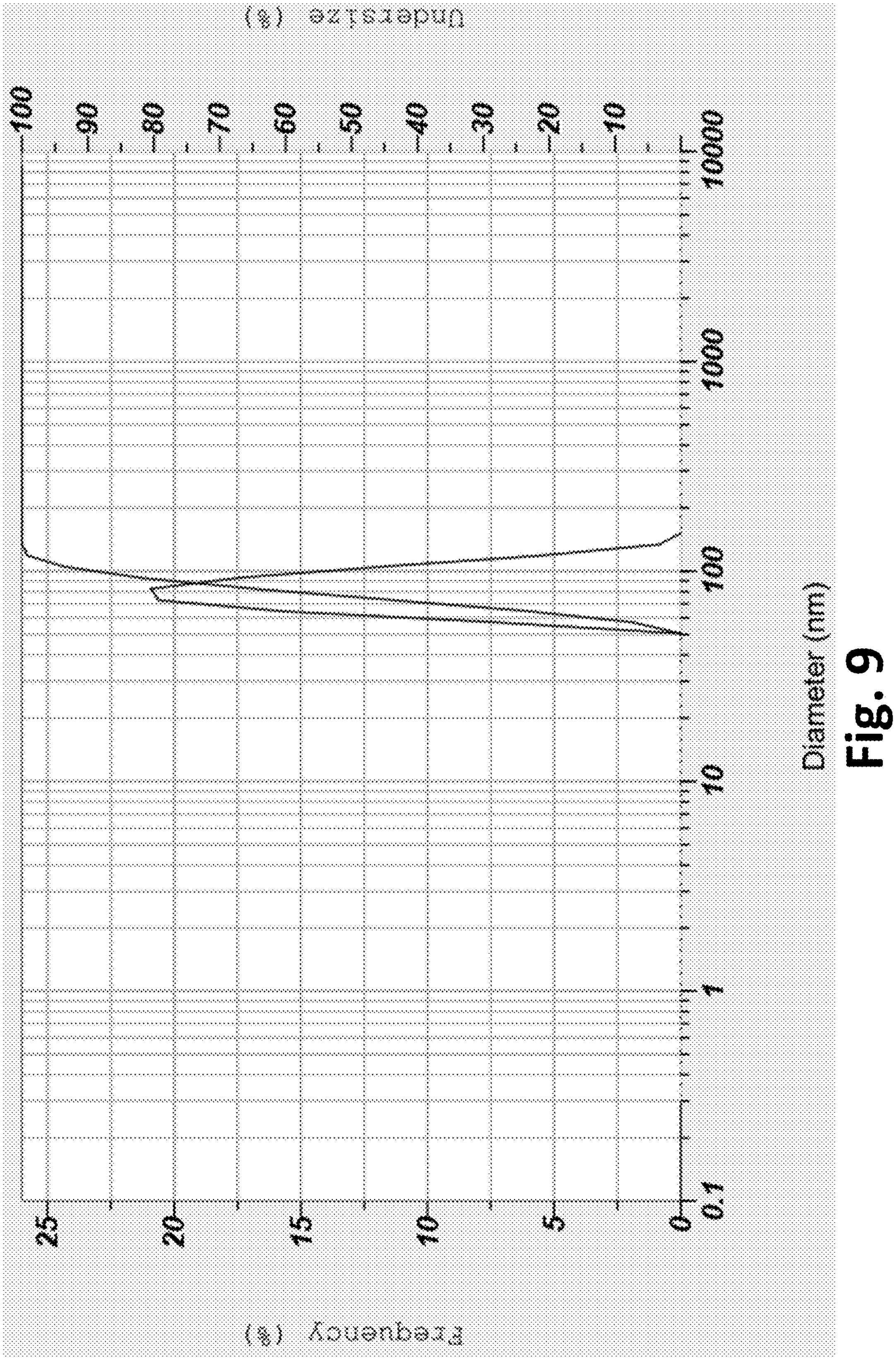
FIG. 9 depicts the results of the DLS analysis for the produced Rosa Damascena essential oil nanoemulsion at a processing time of 20 min.
Figure 10:
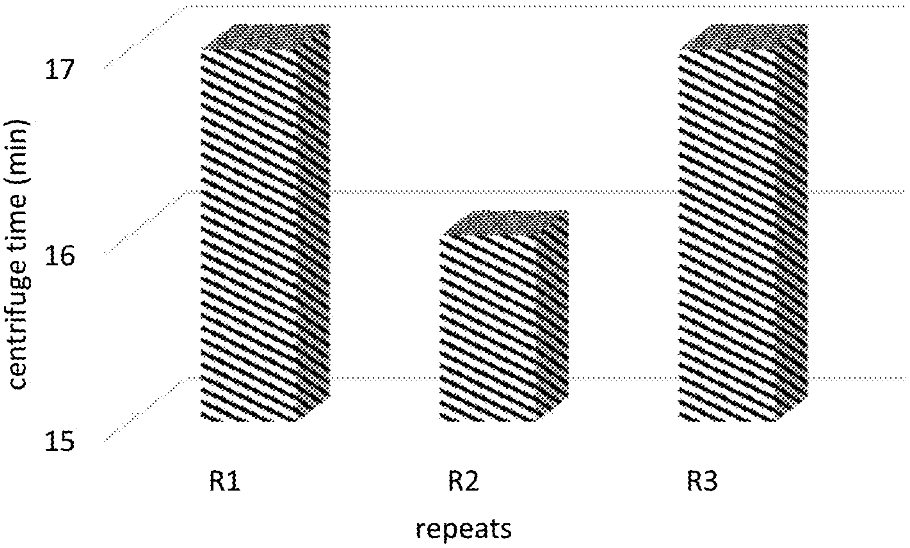
FIG. 10 demonstrates the results of the TEM images for the produced Rosa Damascena essential oil nanoemulsion at the processing time of 20 min.
Figure 11:
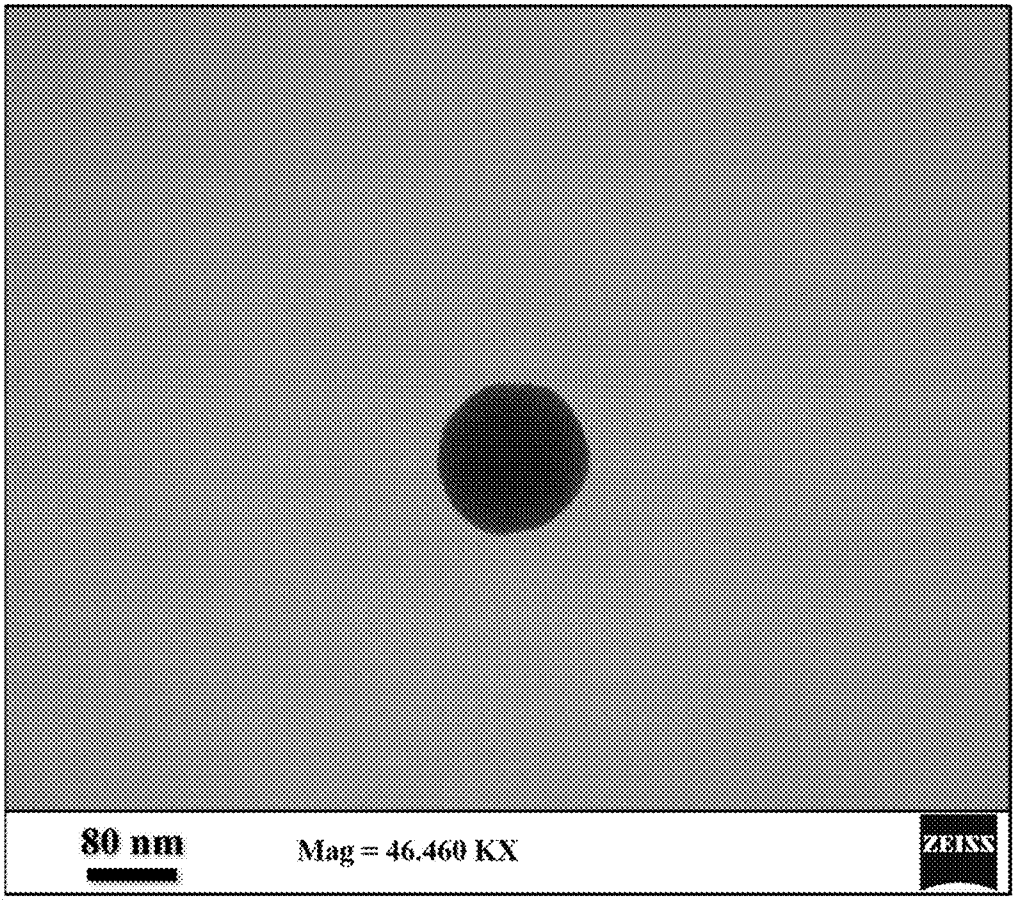
FIG. 11 shows the Rosa Damascena essential oil nanoemulsion stability at a processing time of 20 min.
Figure 12:
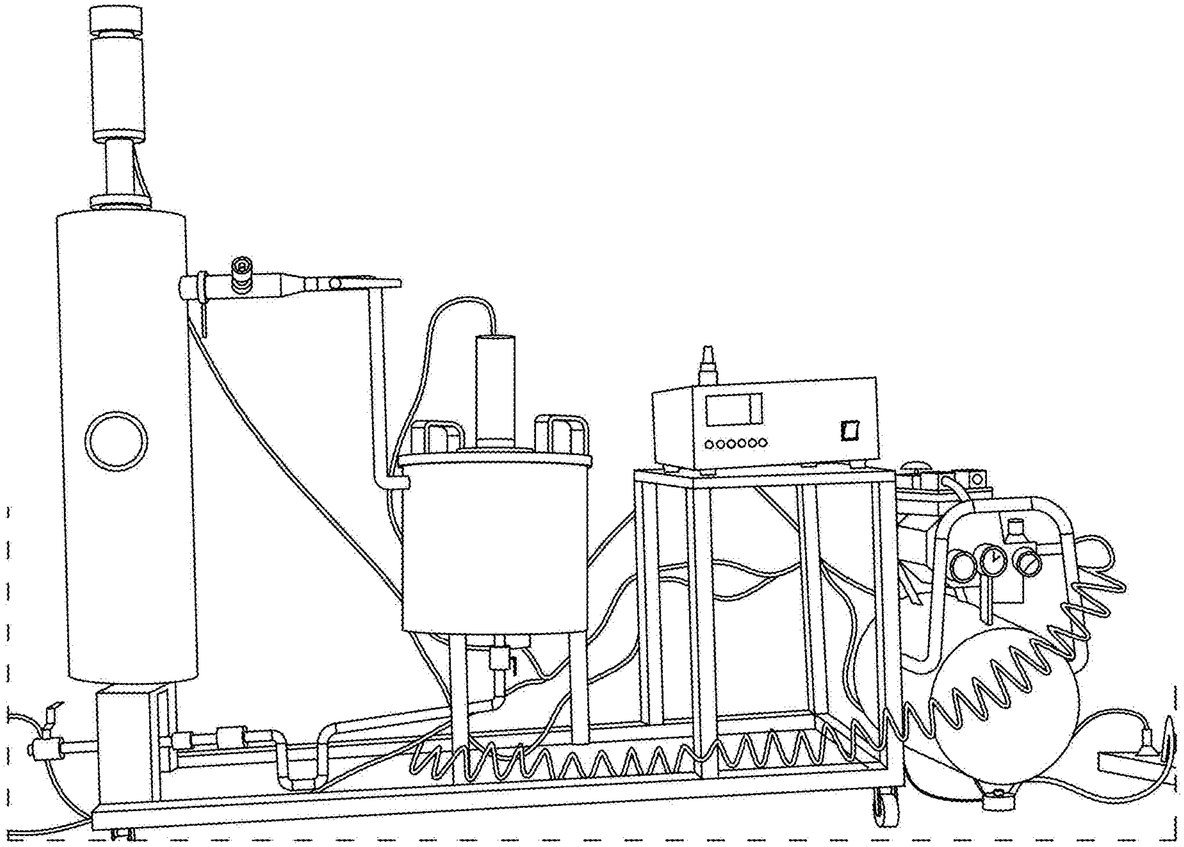
FIG. 12 illustrates the disclosed apparatus.

The mean hydrodynamic diameter of nanodroplets was measured using DLS, results shown in FIG. 9. The stability of the prepared nanoemulsion was measured using the centrifuge-based technique, results shown in FIG. 10. The results of the TEM images show the spherical shape of the nanodroplets with a diameter of 150 nm (FIG. 11). Based on the results from the DLS analysis, the mean diameter of the nanodroplets was 80 nm, see FIG. 9. The created nanoemulsion was stable for 17 min at 4000 rpm. It means that after 17 runs, phase separation was observed.

Example 4: Preparation of the Nanoemulsion of Rosa Damascena Essential Oil (Process Duration: 40 min)

14.85 L of water was added to the bioreactor and the system was switched on. The operational parameters were adjusted: r: 500 rpm, P: 60 psi, T: 45-50° C., t: 30 min. 150 ml of the Rosa Damascena essential oil was added dropwise. The process continued for 30 min. Degassing was then employed using an ultrasonic bath under the following conditions: W: 37 kH, mode: degas, T: 45° C., and t: 5 min. At this step, the main emulsion was prepared. All parameters in example 4 were in accordance with that of Example 3 but the processing time was adjusted to 40 min. During the process, all the operation parameters were fixed.

Based on the results more stability with small nanodroplets was obtained. The final nanoemulsion showed more transparency. According to the results, by increasing time, the efficacy of the apparatus was enhanced. All the operating parameters including the power of the ultrasonication power and rpm of the homogenizer were adjusted at their high level. The temperature was not considered in this study. However, the apparatus can include a heating module and the tanks can be jacketed for thermal insulation.

In a preferred embodiment, the Homogenization tank can have a length of about 45 cm and a width of about 37 cm. The ultrasonication tank can have a length of about 70 cm and a width of about 20 cm. Such dimensions result in better efficiency of the disclosed apparatus. The stirring shaft can be about 15 cm in length and the sonication probe can be about 15 cm in length. The stirring head can be about 15 cm high from the bottom of the homogenization tank. The sonication head can be about 20 cm from the bottom of the ultrasonication tank. Simultaneous and continuous usage of ultrasonic and homogenizer units can produce 10 liters of nanoemulsion containing nanodroplets with a size of <100 nm in a short time. The bioreactor can cause a higher turbulency and more dispersion of the damask rose oil within the water phase due to the air-lift approach. Gas sparger along with stirring increases the agitation in the bioreactor and prepares it for the next step. Advantageously, multiple cycles of simultaneous and continuous usage of homogenizer and ultrasonic units of the disclosed apparatus can produce nanoemulsions containing nanodroplets with a size of <100 nm that are stable for a long duration and can be used in nanocomposites for food packaging.

The presence of a silent air pump and an internal pneumatic pump causes the flow and circulation of the homogenized emulsion from the homogenization tank to the ultrasonic vertical tank, and due to the air pressure, it is pumped again to the homogenization tank with the homogenizer, and this continues for a predetermined number of rounds.

In certain implementations, a titanium probe with a diameter of 12 cm and a height of 82 cm, which vibrates 20,000 times per second and causes the cavitation process in the emulsion, and its combination with a homogenizer of 6,000 rpm and repeating the cycle up to 12 times leads to the particle size of 12-38 nanometers, as well as the power level of the device. The generator emits a frequency of 37 kilohertz from 10 to 100% power. These waves are transmitted in a sweeping model and the time is set between 2 seconds on and 2 seconds off.

In certain implementations, fresh Rosa Damascena essential oil can be extracted using Clevenger in five runs to obtain 250 ml of the pure Rosa Damascena essential oil. The pulp of rose petals created from the first stage can be reused to produce essential oil in the second stage.

The disclosed apparatus is advantageous, for example, the design of the device probe and the high volume of production capacity. Moreover, the process has been made efficient wherein the number of frequent repetitions of the process is prevented. The disclosed invention overcomes the drawbacks with extraction of rose oil i.e., the amount of extractable essential oils from the rose plant are very low and the process itself is difficult. However, during the process of nanoemulsion, this amount increases to eight times, and secondly, the quality of smell and taste becomes much longer and longer, and thirdly, the particle size obtained in this process is within the desirable range.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A method for preparing nanoemulsion from an oil phase and an aqueous phase, the method comprising:

providing an apparatus comprising:

a homogenization unit comprising a homogenization tank, a sonication unit comprising a sonication tank, wherein the homogenization tank and the sonication tank can be fluidly connected to one another so that liquid can circulate between the homogenization tank and the sonication tank, and a pump to affect the circulation of liquid;

feeding a dispersion of the aqueous phase and oil phase into the homogenization unit, wherein the oil phase is an essential oil, and the aqueous phase is water, wherein the dispersion is prepared in a bioreactor, wherein the dispersion is subjected to degassing;

adding an emulsifying agent to the homogenization tank at a predefined duration after adding the dispersion;

continuous pumping, for a first predetermined duration, the dispersion from the homogenization unit to the sonication unit resulting in a circulation of the dispersion from the sonication unit to the homogenization unit.

2. The method according to claim 1, wherein the apparatus further comprises a bypath line connecting the homogenization tank and the sonication tank, wherein the dispersion is circulated through the bypath line.

3. The method according to claim 1, wherein the oil phase is Rosa Damascena essential oil.

4. The method according to claim 3, wherein each of the homogenization tank and the sonication tank are 15 liters in capacity, and the dispersion comprises 150 ml of the Rosa Damascena essential oil in 14.85 L of water.

5. The method according to claim 1, wherein the predefined duration is 5 minutes.

* * * * *